(12) United States Patent
Al-Nadawi et al.

(10) Patent No.: US 12,424,089 B2
(45) Date of Patent: Sep. 23, 2025

(54) SYSTEM AND METHOD FOR CONNECTED VEHICLE-BASED ADVANCED DETECTION OF SLOW-DOWN EVENTS

(71) Applicant: Honda Motor Co., Ltd., Tokyo (JP)

(72) Inventors: Yasir Khudhair Al-Nadawi, Ann Arbor, MI (US); Laith Daman, Novi, MI (US); Hossein Nourkhiz Mahjoub, Ann Arbor, MI (US)

(73) Assignee: Honda Motor Co., Ltd., Tokyo (JP)

( * ) Notice: Subject to any disclaimer, the term of this patent is extended or adjusted under 35 U.S.C. 154(b) by 397 days.

(21) Appl. No.: 17/708,531

(22) Filed: Mar. 30, 2022

(65) Prior Publication Data

US 2023/0053674 A1    Feb. 23, 2023

Related U.S. Application Data

(60) Provisional application No. 63/235,923, filed on Aug. 23, 2021.

(51) Int. Cl.
 *G08G 1/01* (2006.01)
 *B60W 40/105* (2012.01)

(52) U.S. Cl.
 CPC ........ *G08G 1/0141* (2013.01); *B60W 40/105* (2013.01); *G08G 1/0133* (2013.01); *G08G 1/0145* (2013.01); *B60W 2554/4041* (2020.02); *B60W 2554/4049* (2020.02)

(58) Field of Classification Search
 CPC .... G08G 1/0141; G08G 1/013; G08G 1/0145; G08G 1/0112; B60W 40/105; B60W 2554/4041; B60W 2554/4049; B60W 2050/0052; B60W 2556/45; B60W 40/04

USPC ........................................................ 701/117
See application file for complete search history.

(56) References Cited

U.S. PATENT DOCUMENTS 10,657,808 B2 * 5/2020 Lindsay ............... G08G 1/0116
2007/0027583 A1 * 2/2007 Tamir ................ H01L 23/49838
                                                701/1
2015/0317901 A1 * 11/2015 Hegemann ........... G08G 1/0133
                                                701/117

(Continued)

OTHER PUBLICATIONS

Edie, L. Discussion of Traffic Stream Measurement and Description. Proc., 2nd International Symposium on the Theory of Road Traffic Flow (Almond, J. ed.), OECD, Paris, France, 1965.

(Continued)

*Primary Examiner* — Jonathan M Dager
(74) *Attorney, Agent, or Firm* — Rankin, Hill & Clark LLP (57) ABSTRACT

Systems and methods for detecting a traffic event include receiving vehicle data from a plurality of vehicles travelling along a roadway. The method also includes where the roadway is discretized at a cell level into a plurality of cells. The method also includes identifying vehicles of interest that are within a communication range of a host vehicle. Each of the vehicles of interest are associated with a cell of interest from the plurality of cells. Further, the method includes for each cell of interest at each timestep according to a measurement update interval, calculating an average deceleration based on vehicle data transmitted from each of the vehicles of interest associated with the cell of interest. Additionally, the method includes detecting the traffic event based on the average deceleration for each cell of interest at each timestep.

20 Claims, 5 Drawing Sheets

(56) References Cited

U.S. PATENT DOCUMENTS

| | | | | |
|---|---|---|---|---|
| 2017/0369055 | A1* | 12/2017 | Saigusa | G08G 1/096775 |
| 2019/0122543 | A1* | 4/2019 | Matus | G08G 1/0133 |
| 2019/0204100 | A1* | 7/2019 | Sharma | G08G 1/012 |
| 2019/0236941 | A1* | 8/2019 | Lindsay | G08G 1/0112 |
| 2019/0329770 | A1* | 10/2019 | Rajab | H04W 4/46 |
| 2020/0286373 | A1* | 9/2020 | Gordon | G08G 1/0962 |
| 2020/0292338 | A1* | 9/2020 | Fowe | G01C 21/3461 |
| 2021/0104155 | A1* | 4/2021 | Xu | B60W 50/14 |
| 2021/0158311 | A1* | 5/2021 | Hussaini | G08G 1/207 |
| 2022/0119016 | A1* | 4/2022 | Rajvanshi | B60W 60/0059 |
| 2022/0319309 | A1* | 10/2022 | Al-Nadawi | G08G 1/0112 |
| 2023/0230471 | A1* | 7/2023 | Guney | G08G 1/0133 701/26 |
| 2024/0071217 | A1* | 2/2024 | Mattelaer | B60W 60/001 |
| 2024/0087453 | A1* | 3/2024 | Jang | G08G 1/096725 |
| 2024/0135807 | A1* | 4/2024 | Yokoyama | G08G 1/012 |
| 2024/0182038 | A1* | 6/2024 | Kilaru | G08G 1/096708 |
| 2024/0212487 | A1* | 6/2024 | Matsushita | G08G 1/096775 |
| 2024/0416950 | A1* | 12/2024 | Zeiynali Farid | G08G 1/0116 |
| 2025/0111775 | A1* | 4/2025 | Avedisov | G08G 1/0112 |
| 2025/0162580 | A1* | 5/2025 | Borhan | F16H 61/0213 |

OTHER PUBLICATIONS

Abdel-Aty, M. A. et al. (2020). "Using Smartphone as On-board unit (OBU) Emulator Implementation Study". Final Report, BDV24-977-30, February.

Barmpounakis, E. and Geroliminis, N. "On the New Era of Urban Traffic Monitoring with Massive Drone Data: the oNEUMA Large-scale Field Experiment". Transportation Research Part C, 111, pp. 50-71.

Bekiaris-Liberis, N. (2017). Highway Traffic State Estimation with Mixed Connected and Conventional Vehicles. IFAC, 49(3), pp. 309-314.

Chakraborty, P. et al. (2018). Traffic Congestion Detection from Camera Images using Deep Convolution Neural Networks. Transportation Research Record, No. 2672.

Coifman, B. and L. Li (2017). A Critical Evaluation of the Next Generation Simulation (NGSIM) Vehicle Trajectory Dataset. Transportation Research Part B, 105, pp. 362-377.

Elfar, A. et al. (2018). Traffic Shockwave Detection in a Connected Environment using the Speed Distribution of Individual Vehicles. Transportation Research Record, pp. 1-12.

Federal Highway Administration (FHWA). Next Generation SIMulation (NGSIM): https://ops.fhwa.dot.gov/trafficanalysistools/ngsim.htm. Accessed on Jan. 7, 2021.

Ferreira, J. et al. (2017). "Driver Behavior Profiling: An Investigation with Different Smartphone Sensors and Machine Learning". PloS ONE 12(4): e0174959.

Guerrero-Ibáñnez, J. et al. (2018). Sensor Technologies for Intelligent Transportation Systems. Sensors, 18(4): 1212.

Herrera, J and Bayen, A. M. (2010). "Incorporation of Lagrangian Measurements in Freeway Traffic State Estimation". Transportation Research Part B, 44, pp. 460-481.

Khan, S. M. et al. (2017). Real-Time Traffic State Estimation with Connected Vehicles. IEEE Transactions on ITS, 18 (7), pp. 1687-1699.

Li, H. et al. (2018). "Automatic Unusual Driving Event Identification for Dependable Self-Driving". ACM SenSys '18, November.

Li, L. et al. (2020). "Trajectory Data-based Traffic Flow Studies: A Revisit". Transportation Research Part C, 114, pp. 225-240.

Lu, D-N, et al. (2018). "Vehicle Mode and Driving Activity Detection Based on Analyzing Sensor Data of Smartphones" Sensors, 18, 1036.

Lu, X. Y. and A. Skabardonis (2007). Freeway Traffic Shockwave Analysis: Exploring the NGSIM Trajectory Data. Proceedings of the 86th Transportation Research Board Annual Meeting, Washington DC, January.

A. Mizuta, K. Roberts, L. Jacobsen, and N. Thompson, "Ramp metering: A proven, cost-effective operational strategy," U.S. Department of Transportation Federal Highway Administration, Tech. Rep., Oct. 2014.

Stehman, S. V. (1997). "Selecting and Interpreting Measures of Thematic Classification Accuracy". Remote Sensing of Environment. 62 (1): 77-89.

Yu, J. et al. (2017). "Fine-Grained Abnormal Driving Behaviors Detection and Identification with Smartphones". IEEE Transactions on Mobile Computing, 16(8), pp. 2198-2212.

\* cited by examiner

SYSTEM AND METHOD FOR CONNECTED VEHICLE-BASED ADVANCED DETECTION OF SLOW-DOWN EVENTS

RELATED APPLICATIONS

This application claims priority to U.S. Provisional Application Ser. No. 63/235,923 filed on Aug. 23, 2021, which is expressly incorporated herein by reference.

BACKGROUND

Detecting traffic congestion and disseminating related information along roadways are vehicle related advances that significantly impact driving experiences and traffic management. Typical traffic congestion systems rely on roadway infrastructure sensors (e.g., cameras, loop detectors) for accessing and analyzing aggregate traffic patterns. Since these types of sensors are restricted in scope, typical traffic congestion systems are unable to provide dynamic traffic congestion detection on spatial and temporal domains. Other existing systems use trajectory data from on-board sensors and/or portable devices. Systems using this type of trajectory data may be less accurate and detection times are slow. Using real-time information from connected vehicles can facilitate dynamic and advanced detection of traffic congestion. More specifically, connected vehicles can assist in the advanced detection of "slowdown" events (e.g., shockwaves) and vehicle control in response to the slow-down events.

BRIEF DESCRIPTION

According to one aspect, a computer-implemented method for detecting a traffic event includes receiving vehicle data from a plurality of vehicles travelling along a roadway. The method also includes where the roadway is discretized at a cell level into a plurality of cells. The method includes identifying vehicles of interest that are within a communication range of a host vehicle. Each of the vehicles of interest are associated with a cell of interest from the plurality of cells. Further, the method includes for each cell of interest at each timestep according to a measurement update interval, calculating an average deceleration based on vehicle data transmitted from each of the vehicles of interest associated with the cell of interest. Additionally, the method includes detecting the traffic event based on the average deceleration for each cell of interest at each timestep.

According to another aspect, a system for detecting a traffic event on a roadway includes a communication interface and a processor operatively connected for computer communication with the communication interface. The communication interface manages communication of vehicle data from vehicles of interest travelling along the roadway within a communication range. The processor discretizes the roadway at a cell level into a plurality of cells and receives the vehicle data from the vehicles of interest. Each of the vehicles of interest are located within a cell of interest from the plurality of cells. For each of the cells of interest at each timestep, the processor calculates an average deceleration based on vehicle data transmitted from each of the vehicles of interest associated with the cell of interest. Further, the processor detects a traffic event based on the average deceleration for each cell of interest at each timestep.

According to a further aspect, a non-transitory computer-readable storage medium includes instructions that when executed by a processor causes the processor to receive vehicle data from a plurality of vehicles travelling along a roadway. The roadway is discretized at a cell level into a plurality of cells. The processor further identifies vehicles of interest that are within a communication range of a host vehicle. Each of the vehicles of interest are associated with a cell of interest from the plurality of cells. The processor, for each cell of interest at each timestep according to a measurement update interval, calculates an average deceleration based on vehicle data transmitted from each of the vehicles of interest associated with the cell of interest. Further, the processor detects a traffic event based on the average deceleration for each cell of interest at each timestep. Other embodiments of this aspects described above can include corresponding computer systems, apparatus, and computer programs recorded on one or more computer storage devices, each configured to perform the actions described herein.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless area network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. The autonomous vehicle can have any level or mode of driving automation ranging from, for example, fully manual to fully autonomous. Further, the term "vehicle" may include vehicles that are automated or non-automated with predetermined paths or free-moving vehicles.

"Vehicle control system," and/or "vehicle system," as used herein may include, but is not limited to, any automatic or manual systems that may be used to enhance the vehicle, driving, and/or security. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pre-tensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods discussed herein are generally directed to accessing real-time data from multiple sources, including connected vehicles, for advanced detection of traffic events at a cell level. More specifically, traffic events downstream from a host vehicle perspective are detected at the cell level using cell-based average deceleration systems and methods. A "traffic event" as used herein is a travel condition (e.g., traffic congestion, accident, obstacles in the road, potholes, stopped vehicles) that typically results in speed slower than normal and/or a lane change to avoid the travel condition. In some embodiments, a traffic event is referred to as a "slowdown event." For example, a slowdown event can be an occurrence of an abrupt slowdown of vehicles along a roadway and/or a gradual slowdown of vehicles along a roadway. The slowdown event could be in response to an accident, traffic jam, weather, among others. The slowdown event can be characterized by speed and/or a rate in the decrease of speed. For example, in some embodiments described herein, a slowdown event is characterized as a brake-pedal activated event. This can also be referred to as a type 1 braking event or hard braking. For example, emergency braking or panic braking in which an acceleration or deceleration request is made to the vehicle. In other embodiments, a slowdown event is characterized as a brake-pedal non-activated event. This can also be referred to as a type 2 braking event or coasting-down in which no acceleration or deceleration request is made to the vehicle. It is understood that the methods and systems described herein can be implemented with any type of traffic event and/or slowdown event.

Figure 1A:
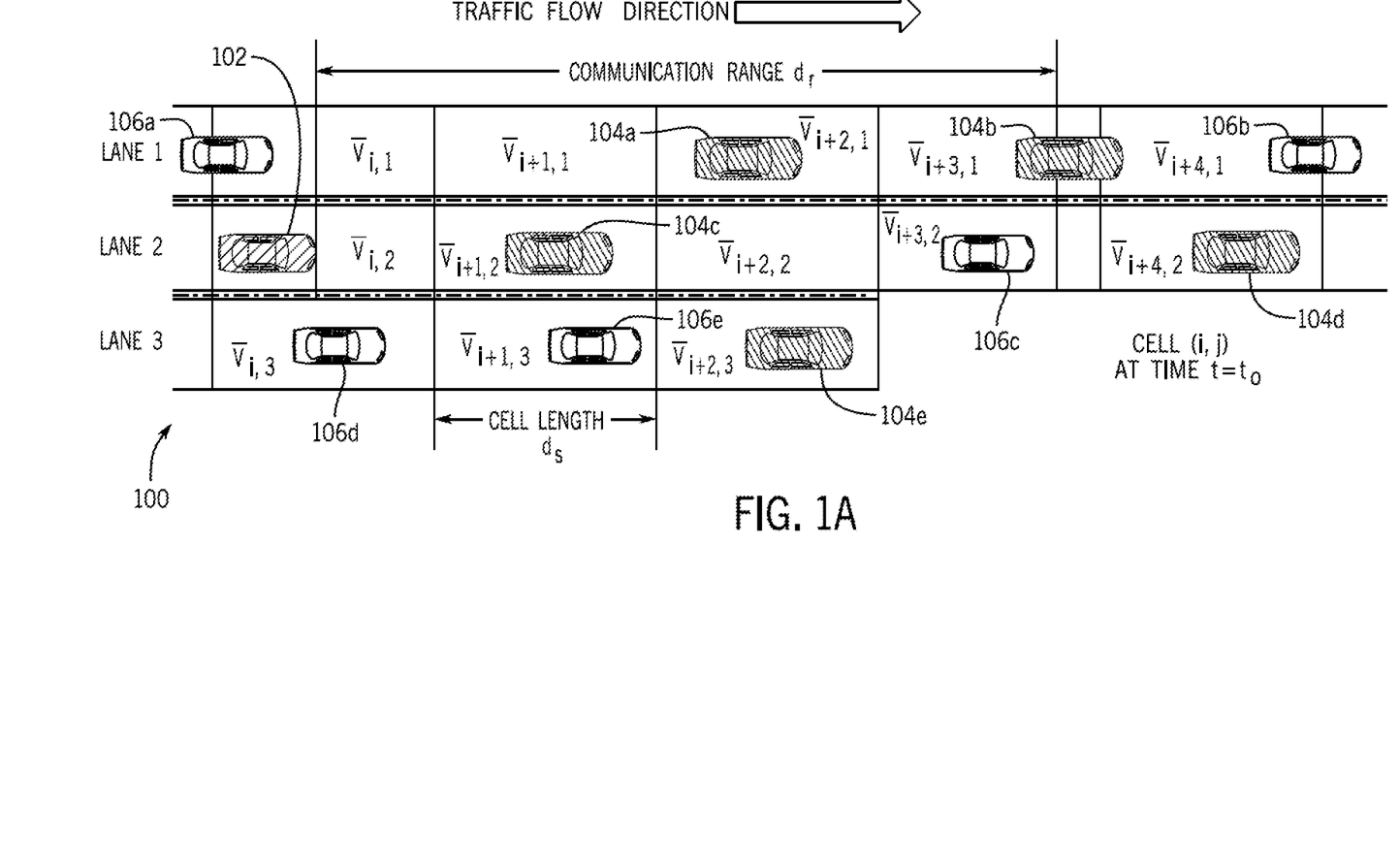
FIG. 1A is a schematic view of a roadway at a time $t=t_0$ according to an exemplary embodiment.

Referring now to the drawings, wherein the showings are for purposes of illustrating one or more exemplary embodiments and not for purposes of limiting same, FIG. 1A is a schematic view of a roadway 100 at a time $t=t_0$ according to an exemplary embodiment. In this example, the roadway 100 (e.g., a highway) includes three lanes, a lane 1, a lane 2, and a lane 3, each having the same traffic flow direction. It is understood that the roadway 100 can have various configurations not shown in FIGS. 1A and 1B, and can have any number of lanes.

Figure 1B:
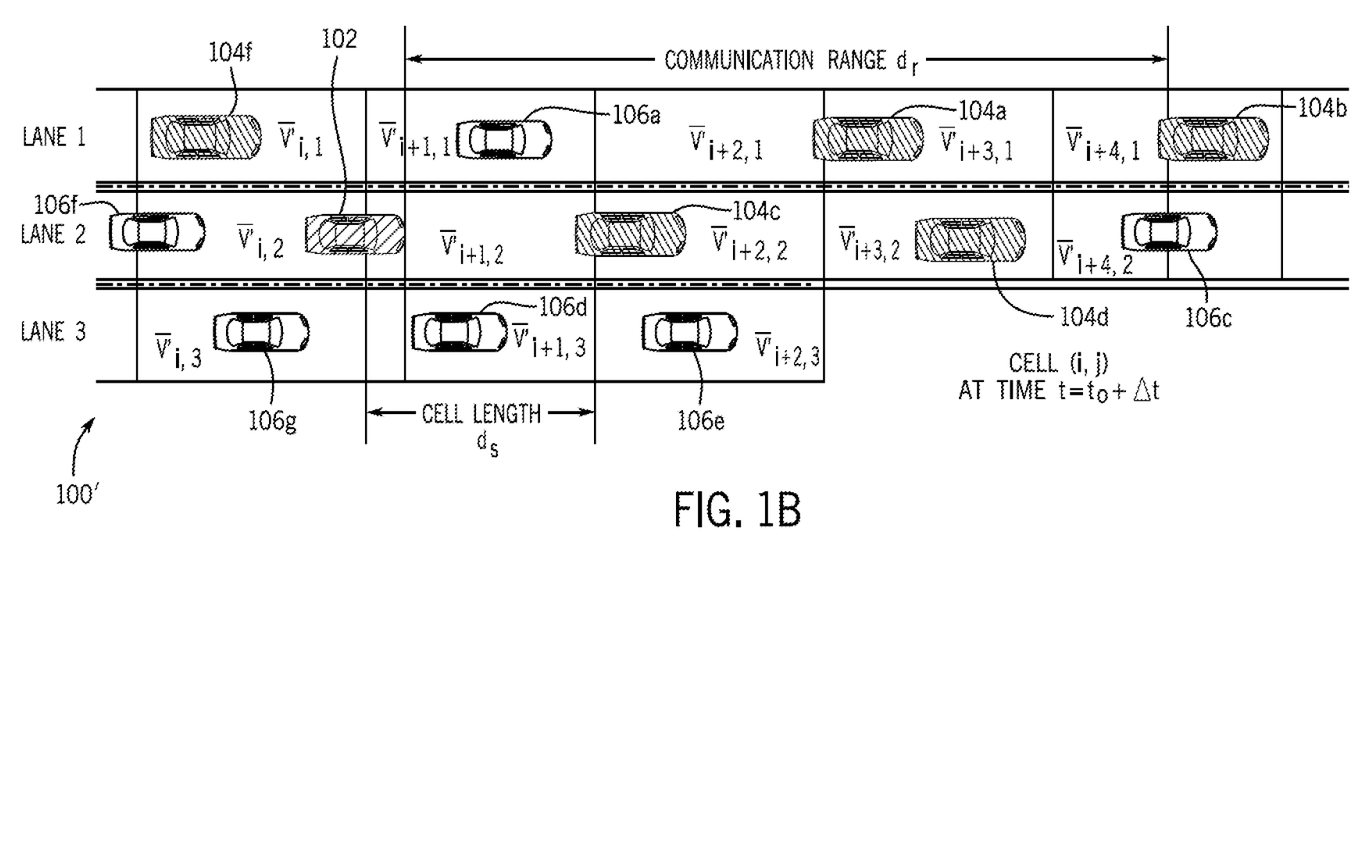
FIG. 1B is a schematic view of the roadway of FIG. 1A at a time $t=t_0+\Delta t$ according to an exemplary embodiment.

In FIG. 1A, a host vehicle 102 is travelling along the roadway 100 in the lane 2. The lane in which the host vehicle is travelling can also be referred to as an ego lane. Also travelling along the roadway 100 is a plurality of vehicles, which includes probe vehicles 104 and non-probe vehicles 106. Probe vehicles 104 can also be referred to as connected vehicles. Probe vehicles 104 are vehicles equipped for computer communication and/or operably connected for computer communication as defined herein (e.g., vehicle-to-vehicle (V2V), cellular). In FIGS. 1A and 1B, the probe vehicles 104 are denoted with a fine hatch pattern. More specifically, in FIGS. 1A and 1B, the probe vehicles 104 include a probe vehicle 104a, a probe vehicle 104b, a probe vehicle 104c, a probe vehicle 104d, a probe vehicle 104e, and a probe vehicle 104f. In the embodiments discussed herein, the host vehicle 102 is a subset of the probe vehicles 104 that execute the vehicle-based advanced detection of traffic events.

In contrast, the non-probe vehicles 106 are vehicles not equipped for computer communication and/or not operably connected for computer communication as defined herein. In FIGS. 1A and 1B, the non-probe vehicles 106 do not contain a fill pattern. More specifically, in FIGS. 1A and 1B, the non-probe vehicles 106 include a non-probe vehicle 106a, a non-probe vehicle 106b, a non-probe vehicle 106c, a non-probe vehicle 106d, a non-probe vehicle 106e, a non-probe vehicle 106f, and a non-probe vehicle 106g.

As will be discussed in further detail herein, the roadway 100 is discretized at a cell level on spatial and temporal domains. For example, as shown in FIGS. 1A and 1B, each lane includes a plurality of lane level cells denoted as cell(i,j) where i represents the index of a segment of the roadway 100 (i.e., a group of cells across lanes), j represents the index of the lanes of the roadway 100, and each cell has a cell length of $d_s$. In some embodiments, the plurality of cells including the characteristics (e.g., time, space) used to discretized the roadway can be referred to as a cell grid. FIGS. 1A and 1B also illustrate a communication range $d_r$ with respect to the host vehicle 102. Probe vehicles 104 that are equipped for computer communication and are within the communication range $d_r$ can communicate with the host vehicle 102 and can be referred to herein as vehicles of interest. It is understood that the communication range $d_r$ can be based on the communication protocol used for V2V communication. As an illustrative example, DSRC communication can have a communication range of 300 m.

As mentioned above, discretization is also performed on a temporal domain. In FIG. 1A, the roadway 100 is shown at a timestep $t=t_0$. In contrast, FIG. 1B illustrates the roadway 100 of FIG. 1A at a timestep $t=t_0+\Delta t$. Accordingly, in FIG. 1B, each cell(I,j) is shown at $t_0+\Delta t$. Since spatial and temporal associations are applied to the roadway 100, the cell grid "moves" with the host vehicle 102. Thus, for example, in FIG. 1A, at the time timestep $t=t_0$, the probe vehicles 104 shown include the probe vehicle 104e, while in FIG. 1B, at the timestep $t=t_0+\Delta t$, the probe vehicle 104e is not shown and the probe vehicle 104f is shown.

As will be discussed in more detail herein, vehicle data communicated with the host vehicle 102 is integrated and/or associated with a corresponding lane level cell at a particular timestep. This vehicle data at a cell level is utilized for advanced detection of traffic events. Although FIGS. 1A and 1B show one vehicle in each cell at each time stamp, it is understood that each cell could potentially contain more than one vehicle at each time stamp.

Figure 2:
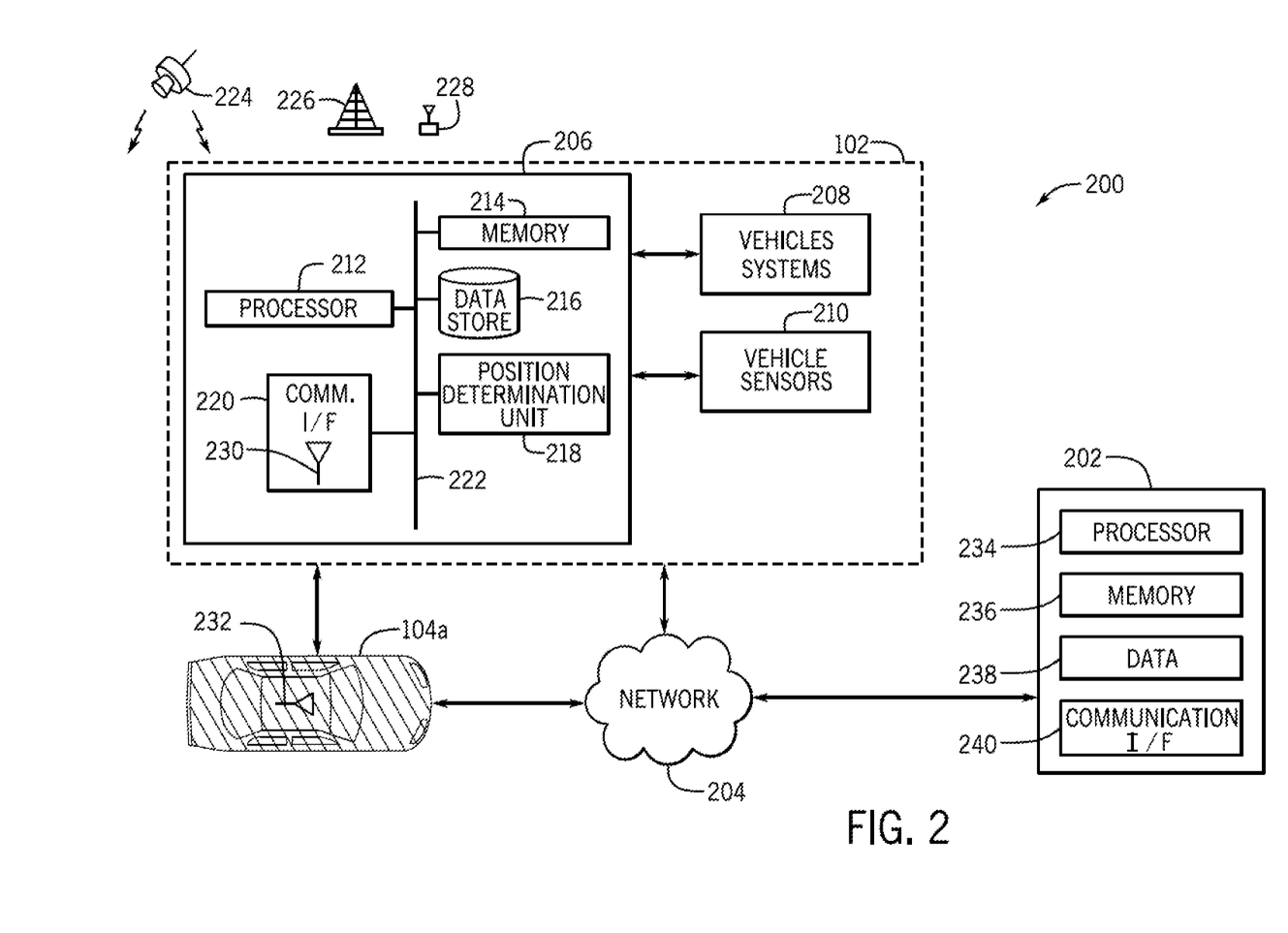
FIG. 2 is a block diagram of a system for vehicle-based advanced detection of traffic events according to one exemplary embodiment.

Referring now to FIG. 2, a block diagram of a system 200 for vehicle-based advanced detection of traffic events according to one exemplary embodiment is shown. One or more of the components of the system 200 can be considered in whole or in part a vehicle communication network. In FIG. 2, a block diagram of the host vehicle 102 is shown with a simplified block diagram of a probe vehicle 104a, a remote server 202, and a communication network 204. It is understood that the components of the system 200, the host vehicle 102, and/or the probe vehicle 104a as well as the components of other systems, hardware architectures, and software architectures discussed herein, can be combined, omitted, or organized into different architectures for various embodiments.

As described herein, in one embodiment, the host vehicle 102 includes and executes the vehicle-based advanced detection of traffic events. The host vehicle 102 does this based on information from sources, for example, other communication-equipped vehicles (e.g., the probe vehicle 104a). As mentioned above, the host vehicle 102 is considered a probe vehicle. The non-probe vehicles 106 do not include components and/or functions for computer communication, however, the non-probe vehicles 106 can include other components and/or functions discussed herein with respect to the host vehicle 102 and/or the probe vehicle 104a.

In FIG. 2, the host vehicle 102 includes a vehicle computing device (VCD) 206, vehicle systems 208, and vehicle sensors 210. Generally, the VCD 206 includes a processor 212, a memory 214, a data store 216, a position determination unit 218, and a communication interface (I/F) 220, which are each operably connected for computer communication via a bus 222 and/or other wired and wireless technologies defined herein. Referring again to the host vehicle 102, the VCD 206, can include provisions for processing, communicating and interacting with various components of the host vehicle 102 and other components of the system 200, including the probe vehicle and the remote server 202. In one embodiment, the VCD 206 can be implemented with the host vehicle 102, for example, as part of a telematics unit, a head unit, an infotainment unit, an electronic control unit, an on-board unit, or as part of a specific vehicle control system, among others.

The processor 212 can include logic circuitry with hardware, firmware, and software architecture frameworks for facilitating vehicle-based advanced detection of traffic events. Thus, in some embodiments, the processor 212 can store application frameworks, kernels, libraries, drivers, application program interfaces, among others, to execute and control hardware and functions discussed herein. In some embodiments, the memory 214 and/or the data store (e.g., disk) 216 can store similar components as the processor 212 for execution by the processor 212.

The position determination unit 218 can include hardware (e.g., sensors) and software to determine and/or acquire position data about the host vehicle 102. For example, the position determination unit 218 can include a global positioning system (GPS) unit (not shown) and/or an inertial measurement unit (IMU) (not shown). In some embodiments, the position determination unit 218 can be a navigation system that provides navigation control and navigation information to the host vehicle 102.

The communication interface 220 can include software and hardware to facilitate data input and output between the components of the host vehicle 102 and other components of the system 200. Specifically, the communication interface 220 can include network interface controllers (not shown) and other hardware and software that manages and/or monitors connections and controls bi-directional data transfer between the communication interface 220 and other components of the system 200 and the probe vehicle 104a using, for example, the communication network 204.

More specifically, in one embodiment, the VCD 206 can exchange data and/or transmit messages with other compatible vehicles and/or devices via a transceiver 230 and/or other communication hardware and protocols. For example, the transceiver 230 can exchange data with the probe vehicle 104a via a transceiver 232. In some embodiments, the host vehicle 102 and the probe vehicle 104a can exchange data (e.g., vehicle data as described herein) utilizing a wireless network antenna 226, roadside equipment (RSE) 228, and/or the communication network 204 (e.g., a wireless communication network), or other wireless network connections.

As mentioned above, in some embodiments, data transmission can be executed at and/or with other infrastructures and servers. For example, in FIG. 2, the VCD 206 can transmit and receive information directly or indirectly to and from the remote server 202 over the communication network 204. The remote server 202 can include a remote processor 234, a remote memory 236, a remote data store 238, and a remote communication interface 240 that are configured to be in communication with one another. Thus, in FIG. 2, the transceiver 230 can be used by the VCD 206 to receive and transmit information to and from the remote server 202 and other servers, processors, and information providers through the communication network 204.

Referring again to the host vehicle 102, the vehicle systems 208 can include any type of vehicle control system and/or vehicle system described herein to enhance the host vehicle 102 and/or driving of the host vehicle 102. As will be described in more, one or more of the vehicle systems 208 can be controlled according to the systems and methods discussed herein. The vehicle sensors 210, which can be implemented alone and/or with the vehicle systems 208, can include various types of sensors for use with the host vehicle 102 and/or the vehicle systems 208 for detecting and/or sensing a parameter of the host vehicle 102, the vehicle systems 208, and/or the environment surrounding the host vehicle 102. Using the system and network configuration discussed above, vehicle-based advanced detection of traffic events can be provided at a lane level.

II. Cell-Based Average Deceleration

Figure 3:
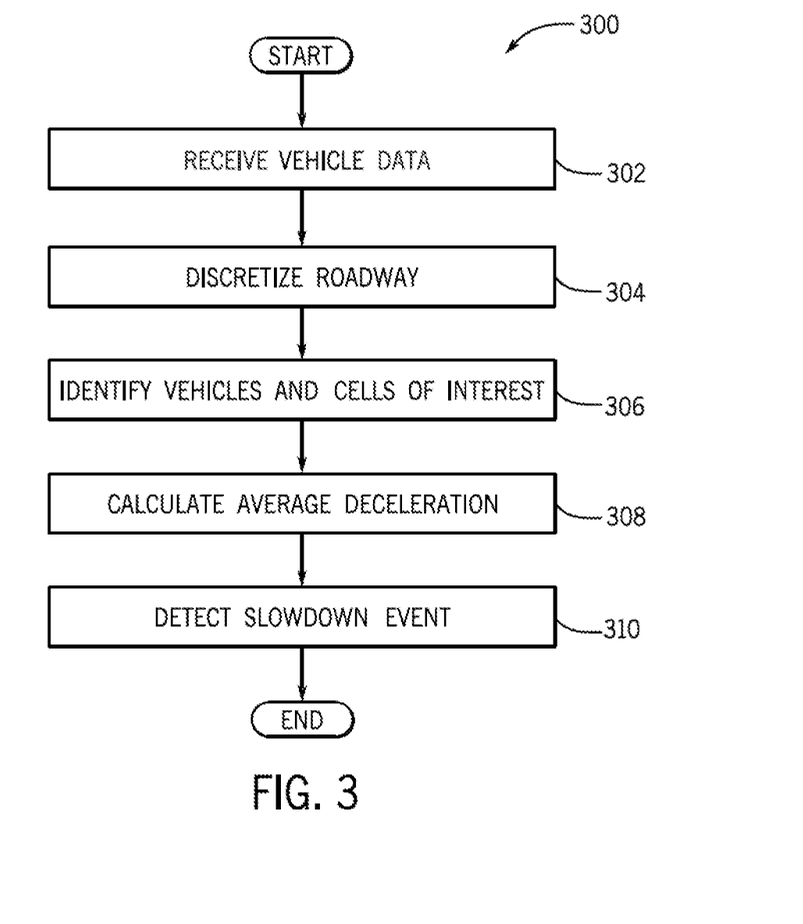
FIG. 3 is a process flow diagram of a method for vehicle-based advanced detection of traffic events according to an exemplary embodiment.

Detailed embodiments describing exemplary methods referring to the roadway 100 of FIGS. 1A and 1B and the system 200 of FIG. 2 will now be discussed in detail. FIG. 3 is a process flow diagram of a method for vehicle-based advanced detection of traffic events according to an exemplary embodiment. At block 302, the method 300 includes receiving vehicle data. For example, vehicle data can be received by the processor 212 from a plurality of vehicles travelling along the roadway 100, for example, from the probe vehicles 104. The vehicle data can be received and monitored continuously according to the timestep t and/or a measurement update interval. In some embodiments, vehicle data is received from identified vehicles of interest and/or cells of interest, which is described herein.

Vehicle data, as used herein, can include any vehicle data about the probe vehicle 104 and/or vehicle control systems of the probe vehicles 104. The vehicle data can be captured by vehicle systems 208 and/or vehicle sensors 210 and corresponding systems and sensors of the probe vehicle 104a. For example, the vehicle data can include vehicle dynamics data and vehicle positioning data included with a Vehicle-to-Everything (V2X) communication message (e.g., a Basic Safety Message) transmitted from the probe vehicles 104 to the host vehicle 102. As an illustrative example, probe vehicle data can include speed, acceleration, velocity, yaw rate, braking data, steering angle, and throttle angle, range or distance data, course heading data, course history data, projected course data, kinematic data, current vehicle position data, and any other vehicle information about the probe vehicles 104 and the environment surrounding the probe vehicles 104.

Referring again to FIG. 3, at block 304, the method 300 includes discretizing the roadway at a cell level into a plurality of cells. As discussed above, in FIGS. 1A and 1B, each lane includes a plurality of lane level cells at time t. Each cell can be denoted as cell(i,j) where i represents the index of a segment of the roadway 100 (i.e., a group of cells across lanes), j represents the index of the lanes of the roadway 100, and each cell has a cell length of $d_s$. In some embodiments, the cell length $d_s$ can be fixed or the cell length $d_s$ can be dynamic based on different traffic scenarios (e.g., different traffic events as defined herein). The discretization at block 304 includes spatially and temporally associating the vehicle data (e.g., received at block 302) from one or more of the plurality of vehicles at the cell level. In one embodiment the vehicle data is from probe vehicles 104 identified as vehicles of interest, described in more detail herein.

Referring again to FIG. 3, at block 306, the method 300 includes identifying vehicles of interest and/or cells of interest. In some embodiments, the processor 212 identifies vehicles of interest that are within the communication range $d_r$. Accordingly, the host vehicle 102 continuously monitors the roadway 100 and the processor 212 identifies vehicles of the plurality of vehicles that are: (a) within the communication range $d_r$; and/or (b) travelling downstream (e.g., in front of) the host vehicle 102. In some embodiments, the host vehicle 102 identifies vehicles of the plurality of vehicles that are: (a) within the communication range $d_r$; (b) travelling downstream (e.g., in front of) the host vehicle 102; and (c) travelling in an ego lane (i.e., in the same lane as the host vehicle 102). It is understood that in some embodiments, the vehicles of interest may not be travelling downstream. Instead, the vehicles of interest can include any vehicle within the communication range $d_r$ regardless of travel direction. In other embodiments, the vehicle of interest can include any vehicle within the communication range $d_r$ travelling behind the host vehicle 102.

As an illustrative example, in FIG. 1A, the vehicles of interest travelling within the communication range $d_r$ include the probe vehicle 104a, the probe vehicle 104b, the probe vehicle 104c, and the probe vehicle 104e. It is understood that each vehicle of interest is located within and/or associated with a cell of interest from the plurality of cells. In some embodiments, the vehicle of interest and/or cell of interest is characterized in that a front bumper is within the boundary of a cell(i,j) or simply termed as "in cell(i,j)." Referring again to the illustrative example above, the probe vehicle 104a is associated with the cell of interest cell(i+2, 1), the probe vehicle 104b is associated with the cell of interest cell(i+3, 1), the probe vehicle 104c is associated with the cell of interest cell(i+2, 2), and the probe vehicle 104e is associated with the cell of interest cell(i+2, 3).

Referring again to FIG. 3, at block 308, the method 300 includes calculating an average deceleration for each cell of interest identified at block 306 based on the vehicle data about each of the vehicles of interest. More specifically, for each cell of interest at each timestep according to a measurement update interval, the processor 212 calculates an average deceleration for each cell of interest based on vehicle data transmitted from each of the vehicles of interest associated with the cell of interest. As will be discussed herein with block 310, the average deceleration for each cell of interest is utilized to detect a traffic event.

Calculation of the average deceleration will now be described in more detail. Initially, ground truth metrics can be determined to serve as a benchmark for verification of the average deceleration for each cell of interest. Accordingly, in one embodiment, the average speed of all vehicles in the communication range $d_r$ (i.e., AvgSpdAll) and the average speed of all the probe vehicles 104 in the communication range $d_r$ (i.e., AvgSpdV2V) are calculated. This information is used to compute the following ground truth metrics:

(1) At any $t=t_n$ at 10 Hz (or recommended) rate:

$$\text{Lane Average Deceleration} = \frac{(AvgSpdAll(t_n) - AvgSpdAll(t_n - \Delta t))}{\Delta t}$$

Where if Lane Average Deceleration≤First Type Threshold
Then Set First Type Slowdown Event Flag for $t=t_n$ to 1 and If (First Type Threshold≤Lane Average Deceleration≤Second Type Threshold
Then Set Second Type Slowdown Event Flag for $t=t_n$ to 1

(2) At any $t=t_n$ with 10 Hz (or recommended) rate $$V2V \text{ Lane Average Deceleration} = \frac{(AvgSpdV2V(t_n) - AvgSpdV2V(t_n - \Delta t))}{\Delta t}$$

Where if V2VLane Average Deceleration≤First Type Threshold
Then Set First Type Slowdown Event Flag for $t=t_n$ to 1 and If (First Type Threshold≤V2V Lane Average Deceleration Second Type Threshold
Then Set Second Type Slowdown Event Flag for $t=t_n$ to 1

In these equations, a First Type Threshold is associated with a first type slowdown event, for example, a type 1 braking event or hard braking as described above. A Second Type Threshold is associated with a second type slowdown event, for example a type 2 braking event or a coasting event as described above. Additionally, $\Delta t$ can be a function of traffic density, for example, based on Level of Service (LOS) standards A-F. As will be discussed in further detail herein, a time window with a configurable length can be used to smooth the V2V traffic speed flag sequence and then decide the actual V2V traffic speed flag from this smoothed sequence. For example, as will be discussed in further detail herein with FIG. 4, using the smoothing window, the system removes any flag fluctuation with duration less than k flags, and then in the smoothed sequence, if flag stays one (1) for n consecutive flags, then set actual V2V traffic speed flag to one (1). Additionally, in both equations above, it is understood that the First Type Threshold and/or the Second Type Threshold can be determined using naturalistic data. In some embodiments an initial threshold estimate can be expressed as:

$$\text{initial threshold estimate: First Type Threshold1} \cong -\frac{2.5 \text{ m}}{s^2}, \quad (3)$$

Second Type Threshold2 $\cong -0.5$ m/s$^2$

The ground truth metrics discussed above can be applied to the calculation of average deceleration. Referring again to block 308 of FIG. 3 calculating an average deceleration based on vehicle data transmitted from each of the vehicles of interest associated with the cell of interest can be expressed mathematically as:

$$\delta_{cell(i,j)}(t; \Delta t) = \frac{\bar{v}_{cell(i,j)}(t) - \bar{v}_{cell(i,j)}(t - \Delta t)}{\Delta t} \text{ and,} \quad (4)$$

$$\bar{v}_{cell(i,j)}(t) = \begin{cases} \frac{\sum_{k \in N_{cell(i,j)}(t)} v_k(t)}{N_{cell(i,j)}(t)}, & K_{cell(i,j)}(t) \neq \emptyset \\ v^{limit}, & \text{otherwise} \end{cases}$$

Where $\delta_{cell(i,j)}(t; \Delta t)$ denotes the average deceleration for cell(i, j) at time t; i represents the index of segment (i.e., a group of cells across lanes); j represent the lane index; $\bar{v}_{cell}(i,j)(t)$ is the average instantaneous speed of vehicles (of interest) whose front bumper are within the boundary of cell(i, j) at time t; $\Delta t$ is a user-defined look-back time step (which could be fixed or scenario dependent (e.g., based on LOS standards); $K_{cell(i,j)}(t)$ denotes the index set of vehicles (of interest) in cell(i, j) at time t; k is the vehicle index in the set $K_{cell(i,j)}(t)$; $v_k(t)$ is the instantaneous speed of vehicle k at time t; and $N_{cell(i,j)}(t)$ represents the number of vehicles (or the size of $K_{cell(i,j)}(t)$) in cell(i, j) at time t.

In some embodiments, to avoid any noise or fluctuations in measuring instantaneous speed, a user-defined time window $\tau \triangleq n \cdot h$ is applied to consecutive measurement update intervals as a filter mechanism, where n is a positive integer. Accordingly, at block 308, the method 300 can also include filtering the instantaneous speed according to a predefined time window applied to consecutive measurement update intervals (e.g., 0.1 seconds for DSRC-enabled connected vehicles). This embodiment will be described in more detail with FIG. 4.

At block 310, the method 300 includes detecting a traffic event (e.g., a slowdown event). The traffic event is detected based on the average deceleration determined at block 308. In some embodiments the processor 212 can control the host vehicle 102 according to the average deceleration and/or the traffic event detected. Blocks 308 and 310 will now be described in more detail with FIG. 4.

III. Traffic Event Detection

Figure 4:
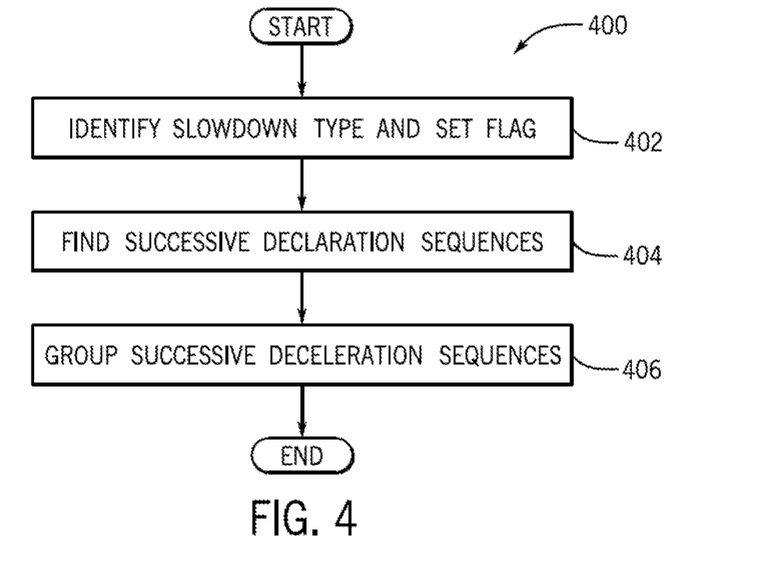
FIG. 4 is a process flow diagram of a method for detecting a slowdown event based on successive deceleration sequences.

Referring now to FIG. 4, a method 400 for determining a traffic event according to one embodiment is shown. As discussed above in Section I, traffic events can include slowdown events. The embodiments described with FIGS. 3 and 4 are described with detection of slowdown events, however, it is understood that other types of traffic events can be considered. In FIG. 4, to determine a slowdown event, the onset of the slowdown event, and the duration of the slowdown event, successive deceleration sequences are identified and grouped.

Accordingly, at block 402 the method 400 includes identifying a slowdown type. In one embodiment, the processor 212 compares the average deceleration of each cell in the cells of interest with predefined thresholds defining the slowdown types. For example, comparing the average deceleration of each cell in the cells of interest with a first type threshold, wherein the first type threshold defines a deceleration measurement associated with a first slow-down traffic event. As described above in detail, the first slowdown traffic event can be a type 1 event or a hard-braking event. In another embodiment, the processor 212 compares the average deceleration of each cell in the cells of interest with a first type threshold and a second type threshold. The second type threshold defines a second deceleration measurement associated with a second slow-down traffic event and identifying successive cells in the cells of interest that satisfy the second type threshold at each timestep. As described above in detail, the second slow-down traffic event can be a type 2 event or a coasting event.

Block 402 also includes setting a flag based on the slowdown type. As mentioned above, in one embodiment, a user-defined time window $\tau \triangleq n \cdot h$ is applied to consecutive measurement update intervals as a filter mechanism, where n is a positive integer. Then, the two types of slow-down events described above on a cell basis would be identified according to the equations below, and the associated flags would be raised for each respective cell:

(5) First Slow-Down Event Type (i.e., brake-pedal activated slow-down event): The Type I Flag of cell(i, j) will be raised at time t, if $\delta_{cell(i,j)}(t-c_1 \cdot h; \Delta t) \leq \theta_1 < 0, \forall c_1 = 0, 1, \ldots n_1$.

(6) Second Slow-Down Event Type (i.e., brake-pedal non-activated slow-down event): The Type II Flag of cell(i, j) will be raised at time t, if $\theta_1 < \delta_{cell(i,j)}(t-c_2 \cdot h; \Delta t) \leq \theta_2 < 0, \forall c_2 = 0, 1, \ldots, n_2$.

In the equations above, $\theta_1$ and $\theta_2$ are user-defined thresholds of cell-based average deceleration to determine the different types of traffic events (i.e., first slow-down event type and second slow-down event type), respectively; and $n_1$, $n_2$ are user-defined positive integers that determine the sizes of filtering windows for Type I and Type II events, respectively. It is understood that in some embodiment, adaptive thresholding can be performed to detect slowdowns in different traffic conditions. Accordingly, it some embodiments, the user-defined thresholds of cell-based average deceleration and/or the user-defined positive integers that determine the sizes of filtering windows for Type I and Type II events discussed above are adaptive.

Referring again to FIG. 4, at block 404, the method 400 includes identifying successive deceleration sequences. In one embodiment, the processor 212 identifies successive cells in the cells of interest that satisfy the first type threshold at each timestep and identifies the successive cells in the cells of interest that satisfy the second type threshold at each timestep. Accordingly, at each time step for a successive h steps, it is determined if multiple cells for a successive h steps have a flag raised. Because of the dynamic nature of driving behaviors, the results are then smoothed for performance evaluation and vehicle control. Accordingly, at block 406, the method 400 includes grouping successive deceleration sequences. More specifically, any successive prediction sequences with too small-time interval(s) are grouped into one detection. Additionally, at block 506, flags are removed for any flag raising event that has too short duration.

III. Vehicle Control and Use Case Scenarios

In some embodiments, the average deceleration values and the detection of the traffic events described above can be utilized to disseminate slowdown event data and/or to control one or more vehicles (e.g., the host vehicle 102) based on the average deceleration and/or the traffic event. For example, in some embodiments, one or more of the vehicles systems 208 can be controlled. In one embodiment, the processor 212 generates a control signal based on the detected traffic event and transmits the control signal to the vehicle systems 208 and/or executes the control signal at the vehicle systems 208. The control and/or modification of the host vehicle 102 can be used to assist in maneuvers to avoid the traffic event and/or mitigate the effects of the traffic event.

As one illustrative example, based on detection of a slowdown event, the processor 212 can control the host vehicle 102 to change lanes to avoid the slowdown event and/or conform to move over laws. In another embodiment, the processor 212 can control a speed of the host vehicle 102 according to a speed limit of the roadway 100 and/or to avoid traffic speed violations. For example, the slowdown event detected can indicate vehicles who are speeding and then reducing speed to a posted speed (e.g., in response to police sighting). In another illustrative example, the processor 212 can control the host vehicle 102 to avoid obstacles in the roadway 100 based on the slowdown event. For example, the processor 212 can control speed and/or lane change to avoid an obstacle and return to the ego lane.

As another illustrative example, the determination of the slowdown event can also be used to modify navigation of the host vehicle 102. For example, re-routing by the processor 212 and/or the position determination unit 218 can be based on the slowdown event. This allows the host vehicle to avoid general congestion and/or backed up roadways. It is understood that the processor 212 can communicate data about the slowdown events to the remote server 202 for reporting purposes, for example, to an Original Equipment Manufacturer and/or state and federal transportation departments. Additionally, in the control situations described above, traffic notifications, suggestions, and/or warnings can be provided to the host vehicle 102 based on the detected traffic event and/or vehicle control. For example, the processor 212 can provide an alert signal or a graphic representation based on the traffic event to alert the host vehicle 102 and/or other vehicles on the roadway 100. It is understood that other use case scenarios not discussed herein can also be contemplated.

The invention claimed is:

1. A computer-implemented method for detecting a traffic event on a roadway, comprising:
receiving vehicle data from a plurality of vehicles travelling along the roadway, wherein the roadway is discretized at a cell level into a plurality of cells;
dynamically adapting a length of each cell of the plurality of cells based on traffic conditions of the roadway;
identifying vehicles of interest that are within a communication range of a host vehicle, wherein each of the vehicles of interest is associated with a cell of interest from the plurality of cells;
for each cell of interest across a plurality of timesteps according to a measurement update interval, calculating an average deceleration based on vehicle data transmitted from each of the vehicles of interest associated with the cell of interest;
setting a traffic speed flag sequence including traffic speed flags for each cell of interest at each timestep of the plurality of timesteps based on the average deceleration;
applying a predefined time window with a predetermined length to smooth the traffic speed flag sequence to generate a smoothed traffic speed flag sequence; and
detecting a traffic event based on the average deceleration and the smoothed traffic speed flag sequence for each cell of interest at each timestep of the plurality of timesteps.

2. The computer-implemented method of claim 1, including discretizing the roadway spatially and temporally at the cell level into the plurality of cells.

3. The computer-implemented method of claim 1, wherein the vehicle data transmitted from each of the vehicles of interest includes an instantaneous speed.

4. The computer-implemented method of claim 3, wherein the instantaneous speed is filtered according to the predefined time window applied to consecutive measurement update intervals.

5. The computer-implemented method of claim 1, wherein detecting the traffic event includes comparing the average deceleration of each cell in the cells of interest with a first type threshold, wherein the first type threshold defines a deceleration measurement associated with a first slowdown traffic event.

6. The computer-implemented method of claim 5, wherein the first slow-down traffic event is one of a hard-braking traffic event and a coasting down traffic event.

7. The computer-implemented method of claim 5, further including identifying successive cells in the cells of interest that satisfy the first type threshold at each timestep.

8. The computer-implemented method of claim 5, further including comparing the average deceleration of each cell in the cells of interest with a second type threshold, wherein the second type threshold defines a second deceleration measurement associated with a second slow-down traffic event and identifying successive cells in the cells of interest that satisfy the second type threshold at each timestep.

9. The computer-implemented method of claim 8, wherein the first slow-down traffic event is a hard-braking traffic event and the second slow-down traffic event is a coasting down traffic event.

10. The computer-implemented method of claim 1, including controlling the host vehicle based on a type of the traffic event, wherein the type of the traffic event is one of a hard-braking traffic event and a coasting down traffic event.

11. A system for detecting a traffic event on a roadway, comprising:
a communication interface for communicating vehicle data from vehicles of interest travelling along the roadway within a communication range; and
a processor operatively connected for computer communication with the communication interface, wherein the processor:
discretizes the roadway at a cell level into a plurality of cells;
dynamically adapts a length of each cell of the plurality of cells based on traffic conditions of the roadway;
receives the vehicle data from the vehicles of interest, wherein each of the vehicles of interest is located within a cell of interest from the plurality of cells;
for each of the cells of interest across a plurality of timesteps according to a measurement update interval, calculates an average deceleration based on the vehicle data transmitted from each of the vehicles of interest associated with the cell of interest;
sets a traffic speed flag sequence including traffic speed flags for each of the cells of interest at each timestep of the plurality of timesteps based on the average deceleration;
applies a predefined time window with a predetermined length to smooth the traffic speed flag sequence to generate a smoothed traffic speed flag sequence; and detects a traffic event based on the average deceleration and the smoothed traffic speed flag sequence for each cell of interest at each timestep of the plurality of timesteps.

12. The system of claim 11, wherein the vehicle data transmitted from each of the vehicles of interest includes an instantaneous speed and calculating the average deceleration is based on the instantaneous speed of each vehicle of interest located within the cell of interest.

13. The system of claim 11, wherein detecting the traffic event is based on the average deceleration of each cell in the cells of interest, a first type threshold, and a second type threshold, wherein the first type threshold defines a first deceleration measurement associated with a first slow-down traffic event and the second type threshold defines a second deceleration measurement associated with a second slow-down traffic event.

14. The system of claim 13, wherein the first slow-down traffic event is one of a hard-braking traffic event and a coasting down traffic event.

15. The system of claim 13, wherein detecting the traffic event includes identifying successive cells in the cells of interest that satisfy the first type threshold at each timestep and identifying successive cells in the cells of interest that satisfy the second type threshold at each timestep.

16. A non-transitory computer-readable storage medium including instructions that when executed by a processor, causes the processor to:
receive vehicle data from a plurality of vehicles travelling along a roadway, wherein the roadway is discretized at a cell level into a plurality of cells;
dynamically adapt a length of each cell of the plurality of cells based on traffic conditions of the roadway;
identify vehicles of interest that are within a communication range of a host vehicle, wherein each of the vehicles of interest is associated with a cell of interest from the plurality of cells;
for each cell of interest across a plurality of timesteps according to a measurement update interval, calculate an average deceleration based on vehicle data transmitted from each of the vehicles of interest associated with the cell of interest;
set a traffic speed flag sequence including traffic speed flags for each of the cells of interest at each timestep of the plurality of timesteps based on the average deceleration;
apply a predefined time window with a predetermined length to smooth the traffic speed flag sequence to generate a smoothed traffic speed flag sequence; and
detect a traffic event based on the average deceleration and the smoothed traffic speed flag sequence for each cell of interest at each timestep of the plurality of timesteps.

17. The non-transitory computer-readable storage medium of claim 16, wherein the vehicle data transmitted from each of the vehicles of interest includes an instantaneous speed, and the average deceleration is calculated based on the instantaneous speed of each vehicle of interest located within the cell of interest.

18. The non-transitory computer-readable storage medium of claim 16, further causing the processor to detect detecting the traffic event based on the average deceleration of each cell in the cells of interest, a first type threshold, and a second type threshold, wherein the first type threshold defines a first deceleration measurement associated with a first slow-down traffic event and the second type threshold defines a second deceleration measurement associated with a second slow-down traffic event.

19. The non-transitory computer-readable storage medium of claim 18, wherein the first slow-down traffic event is one of a hard-braking traffic event and a coasting down traffic event.

20. The non-transitory computer-readable storage medium of claim 19, further causing the processor to identify successive cells in the cells of interest that satisfy the first type threshold at each timestep and identifying successive cells in the cells of interest that satisfy the second type threshold at each timestep.

* * * * *